United States Patent [19]
Cahoon

[11] Patent Number: 5,592,594
[45] Date of Patent: Jan. 7, 1997

[54] METHOD AND APPARATUS FOR ALLOCATING CACHE MEMORY SPACE FOR FONT DATA

[75] Inventor: James B. Cahoon, Meridian, Id.

[73] Assignee: Hewlett-Packard Company, Palo Alto, Calif.

[21] Appl. No.: 233,183

[22] Filed: Apr. 26, 1994

[51] Int. Cl.$^6$ ............................................. G06F 12/00
[52] U.S. Cl. .................. 395/115; 395/101; 395/110; 395/507; 395/501
[58] Field of Search ............................ 395/162–166, 395/101, 102, 109, 110, 115

[56] References Cited

U.S. PATENT DOCUMENTS

| | | | |
|---|---|---|---|
| 5,138,696 | 8/1992 | Nagata | 395/110 |
| 5,226,116 | 7/1993 | Sasaki | 395/150 |
| 5,301,267 | 4/1994 | Hassett et al. | 395/150 |
| 5,394,514 | 2/1995 | Matsubara | 395/115 |
| 5,438,656 | 8/1995 | Valdes et al. | 395/143 |

Primary Examiner—Kee M. Tung
Assistant Examiner—U. Chauhan

[57] ABSTRACT

Font character data is maintained in a cache memory in bit map form. Each character is identified a unique identifier (ID) value. The printer searches the cache memory only by ID value to determine the presence of a character in the cache. Pointer tables are avoided. A list is maintained of characters recently employed by the printer and is arranged so as to enable determination of a ranking of usage among the listed characters in cache. When a new character is requested by the printer, the cache is initially searched to determine if the character is present therein. If the character is found, it is immediately accessed and its identifier is placed at the head of the usage list. Other characters are pushed down in the list. The least recently used character in the list (at the list's bottom) is removed unless it is being employed in a print action, in which case, a next higher character in the list is examined to determine if it should be removed based upon both usage criteria and requirement for a page being processed.

10 Claims, 2 Drawing Sheets

15,592,594

METHOD AND APPARATUS FOR ALLOCATING CACHE MEMORY SPACE FOR FONT DATA

FIELD OF THE INVENTION

This invention relates to printers that are capable of printing multiple fonts and, more particularly, to a method and apparatus for controlling allocation of cache memory space so as to conserve cache memory size while assuring rapid availability of font data.

BACKGROUND OF THE INVENTION

Present day print mechanisms, such as ink jet and laser-based printers, have the capability of producing text outputs exhibiting many different font presentations. Character fonts are provided to the print mechanisms via read only memories which store the font data in the form of character outlines. In the case of printers employed for Latin-based languages, font sizes are such as to enable an entire font to be accessed from ROM and to be "rasterized" into a bit map state, ready for printing when called upon by the print mechanism. In prior art printers, tables of pointers are constructed which point to bit map data or outline font data, as the case may be. A table is created for every orientation, point size and data type (i.e. bit map or outline) for every font that has character data in use. Because Latin character codes range between 0 and 255, the table method enables a high performance access technique with a fairly low memory cost for the pointer tables.

By contrast, fonts employed for Asian character sets encompass tens of thousands of different characters. The provision of tables of pointers to the font data becomes impractical due to the large amount of memory space which is consumed by the tables (not even considering the memory space required for the font data). Further, because of the large quantity of required Asian characters, the technique of pre-rasterizing the outline font data and maintaining it in bit map form results in extremely large memory sizes. Thus, while the immediate availability of pre-rasterized Asian font data enables high speed printer operation, the cost of achieving such operation is concomitantly high.

Accordingly, it is an object of this invention to provide an improved method and apparatus for handling of printer font data.

It is another object of this invention to provide a memory management technique which enables high usage font data to be available in the form of bit map data to the printer mechanism.

It is yet another object of this invention to control which font data is present in bit map form in a cache memory, based upon recent usage.

SUMMARY OF THE INVENTION

Font character data is maintained in a cache memory in bit map form. Each character is identified by a unique identifier (ID) value. The printer searches the cache memory only by ID value to determine the presence of a character in the cache. Pointer tables are avoided. A list is maintained of characters recently employed by the printer and is arranged so as to enable determination of a ranking of usage among the listed characters in cache. When a new character is requested by the printer, the cache is initially searched to determine if the character is present therein. If the character is found, it is immediately accessed and its identifier is placed at the head of the usage list. Other characters are pushed down in the list. The least recently used character in the list (at the list's bottom) is removed unless it is being employed in a print action, in which case, a next higher character in the list is examined to determine if it should be removed, based upon both usage criteria and if the character is required for a page being processed.

DETAILED DESCRIPTION OF THE INVENTION

Figure 1:
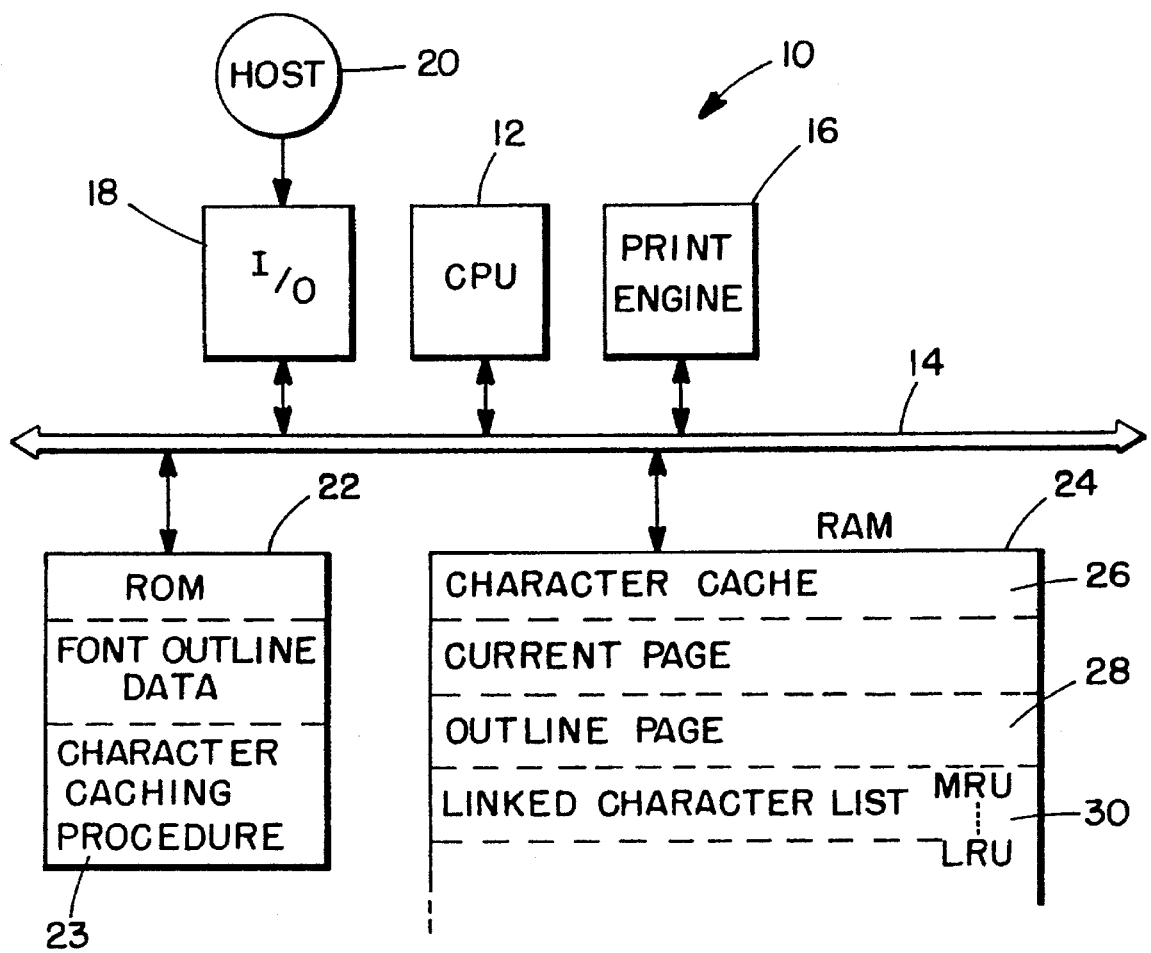
FIG. 1 is a block diagram of a printer embodying the invention hereof.

Referring to FIG. 1, a printer 10 comprises a central processing unit 12 which communicates with other modules within printer 10 via a bus system 14. A print engine 16 is connected to bus 14 and contains apparatus for providing either ink jet or laser-based electrophotography printing actions. An input/output (I/O) module 18 enables communications with a host processor 20. A read only memory (ROM) 22 contains font outline data and a character caching procedure 23 which implements cache management actions. Random access memory (RAM) 24 provides the main storage facility for printer 10.

Within RAM 24 is a character cache 26 and an area 28 that includes both an indication of a current page number just processed and awaiting printing, and the output page number of the page just outputted by print engine 16. RAM 24 further includes a linked character list 20 wherein a most recently used character resides at the top of the list and a least recently used character resides at the bottom of the list. Those skilled in the art will realize that much additional data is contained within RAM 24, but that it is not directly relevant to the invention discussed herein.

When printer 10 commences operation, its operating system allocates a fixed size of RAM 24 for use as character cache 26. The size of character cache 26 can be predetermined and set to the needs of the environment. If a Kanji font is contemplated for use, then the size of RAM 24 allocated to character cache 26 is much greater than if the printer is to be employed with a Latin-based language.

Once RAM size for character cache 26 is allocated, cache 26 is initialized by the printer's operating system. The portion of the operating system which performs this function is termed the "personality" of the printer and is the software which places data into character cache 26, requests a search for data or deletes specific data or clears the entire character cache 26.

When character cache 26 is not full of data, any cache request from the printer's personality is honored, size permitting. When character cache 26 is filled, character caching procedure 23 comes into play and takes over in deciding which data to replace when a request is made.

Figure 2:
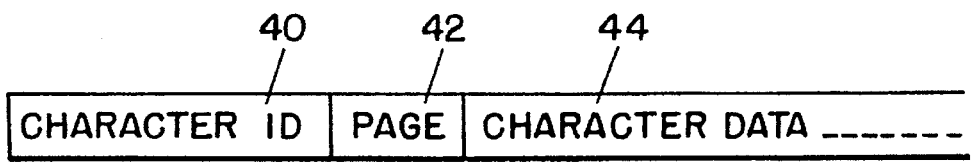
FIG. 2 is a schematic showing of a character data structure in a character cache within the printer of FIG. 1.

Character data is stored in the form shown in FIG. 2. Each character record in character cache 26 includes a character ID field 40 which is a unique identifier that enables a search routine to determine whether the identified character is or is not stored within character cache 26. A further field area 42 includes a page designation that indicates the highest page number of pages being processed within printer 10 which will require character data 44. Character data 44 may be either full character raster data or may be outline data which is yet to be rasterized. It is preferred that the character data in field 44 be fully rasterized data.

During a print operation, CPU 12, in conjunction with the printer personality software, places a call for a specific character to be used in the print action. In response, character cache 26 is searched to determine if the requested character is in cache 26. The search is carried out by examining a linked list of character ID structures in character cache 24 to determine if an entry is present with an identical value to the character ID of the character being searched. To conserve search time, character IDs may be distributed into regions in accordance with a hash table. Each hash table entry includes a pointer to a linked list of a span of character IDs in a region. A received character ID is segregated into a region and only that region is searched.

If a match is found by the search, a pointer to character cache 26 is returned which indicates the address of the character record. If a match is not found, a null pointer is returned, signifying that the character is not in character cache 26 and must be accessed from font outline data in ROM 22. Next, character caching procedure 23 is called and implements a character replacement algorithm which determines if there is room to put new character data in character cache 26 and if not, to make room in character cache area 26 for the new character data.

Certain data structures are maintained to enable character cache procedure 23 to carry out its character replacement algorithm. The current page number just processed by CPU 12 and ready for printing and the output page number just printed by print engine 16 are recorded in RAM area 28. Since the current page has already been processed and is awaiting printing, the character caching procedure adds 1 to the current page number to determine the earliest page being processed by CPU 12. If any character in character cache area 26 is required for a page value lying between the current page number plus 1 to the output page number, the character record is maintained in character cache area 26.

A further data structure employed by character caching procedure 23 is doubly linked character list 30 maintained in RAM 24. Linked character list (LCL) 30 comprises a listing of character IDs from the most recently used character to the least recently used character. Each time a character is used, it's character ID 40 is moved to the top of LCL 30 and all other character ID's are moved down. Character caching procedure 23 employs LCL 30 to determine which character data is to be removed from character cache 26.

Figure 3:
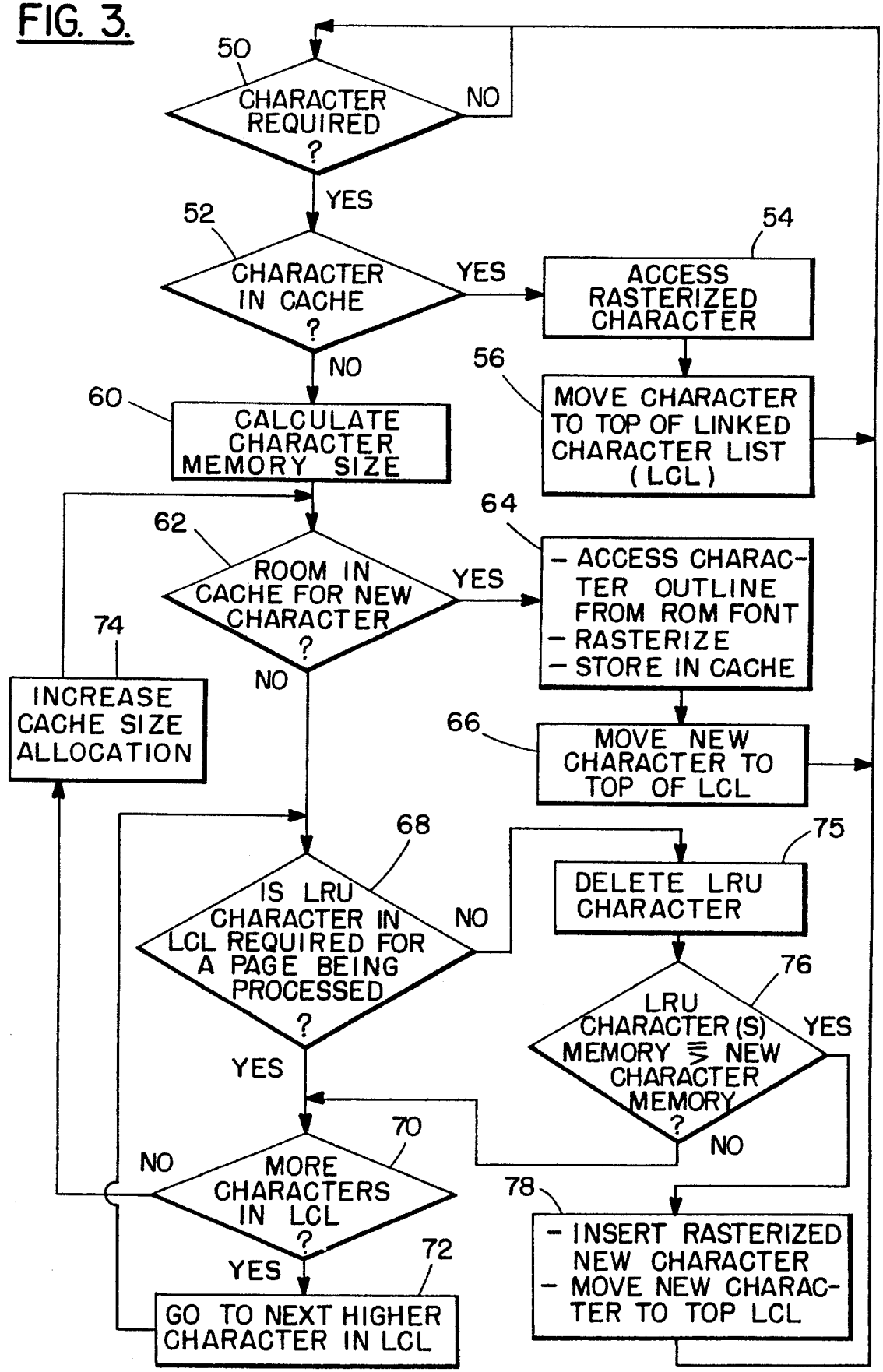
FIG. 3 is a high level flow diagram illustrating the method performed by the system of FIG. 1 to carry out the invention hereof.

Turning to FIG. 3, character caching procedure 23 will be further described. Initially, as shown by decision box 50, the procedure awaits a notification from the printer personality (as executed by CPU 12) that a new character is required. Upon receipt of that indication, character caching procedure 23 determines if the requested character is already present in character cache 26. This determination is made by a search of character ID's of characters stored in character cache area 26. If a "hit" occurs, the stored character is accessed (box 54) and the character ID of the accessed character is moved to the top of linked character list (LCL) 30 in RAM 24. All other listed characters in LCL 30 are "moved down" one position in the list. The procedure then recycles and waits for the next character requirement to occur.

If, as shown in decision box 52, it is determined that the requested character is not present in character cache 26, the memory size required for the requested character is calculated (box 60). That calculated memory size is then subtracted from the unused memory area in character cache area 26 to determine if a positive or negative result occurs. In the event a positive result occurs, decision box 62 determines that room exists in character cache 26 for the new character.

The character outline data is then accessed from ROM 22, and the character data is rasterized (including "fill" data) and is stored in character cache 26 (box 64). Next, the new character ID is moved to the top of LCL 30 in RAM 24 (box 66) and the procedure recycles.

If insufficient memory (i.e. a negative result) is found in character cache area 26 to accommodate the memory requirements of the new character (decision box 62), a decision must be made as to which character data is to be removed from character cache 26 to make room for the new character data. This decision process commences (decision box 68) by determining whether the least recently used (LRU) character in LCL 30 is required for a page being processed by printer 10. This determination is made using the current page and output page data in area 28 of RAM 24 and comparing that data with the page data in field 42 (FIG. 2) of the LRU character record.

It will be recalled that the current page value is the fully processed page that is waiting in the print queue to be printed and that the output page value is the last page number to have been outputting from print engine 16. The current page value is, therefore, incremented by 1 to include any page presently being processed—but not yet ready for placement in the print queue. Assuming that the LRU character in LCL 30 is required for a page being processed, that LRU character is not removed from LCL 30. In such case, the procedure moves to decision box 70 where it determines if there are more characters in LCL 30 and if yes, the next higher character in LCL 30 is examined (box 72) in accordance with decision box 68. The procedure recycles until either an LRU character is found that is not required for a page being processed or no further characters are present in LCL 30. In the latter case, the procedure may increase the cache size allocation (box 74) and recycle back to decision box 62.

If it is found that the LRU character is not required for a page being processed (decision box 68), it is removed from character cache 26 (box 75). It is next determined whether the memory area occupied by the removed LRU character (and any previously removed characters) is equal to or greater than the memory required by the new character (decision box 76). If not, an additional LRU character must be removed from character cache 26 to make room for the new character. In such case, the procedure continues through the procedure line including decision box 70, box 72 and decision box 68 until sufficient LRU characters are found which, after removal from character cache 26, "free-up" sufficient memory for the new character. In such case (as shown in box 78), the LRU character (or characters) have been removed from character cache 26 and the rasterized new character is inserted into character cache 26. LCL 30 is then updated by moving the character ID of the new character to the top of LCL 30. The procedure then recycles.

As can be seen from the above, this invention (1) stores rasterized font data in a character cache, making the rasterized data immediately available for use in the print process; (2) avoids the need for large tables of pointers to character data by associating each character with a unique character ID to enable associative searching of the character data in character cache 26 to determine the presence or non-presence of a character in character cache 26; and (3) adaptively determines which character data should be removed from character cache 26 based upon a least recently used status and a determination whether a character is required for a page currently being processed by the printer mechanism. These combined features enable a printer to handle large Asian fonts and to make individual characters of an Asian font rapidly available to the print mechanism, while assuring minimal use of memory and adaptive management of a cache wherein recently used character data may be staged.

It should be understood that the foregoing description is only illustrative of the invention. Various alternatives and modifications can be devised by those skilled in the art without departing from the invention. For instance, the invention may be applied to other types of print data storage management, such as for character outlines, graphics features, etc. Accordingly, the present invention is intended to embrace all such alternatives, modifications and variances which fall within the scope of the appended claims.

What is claimed is:

1. A printer comprising:

a print mechanism;

a cache memory for storing plural character records, each character record including a unique identifier;

a font memory for storing character outline data for plural characters of a font;

means for determining if a character record is required to be used at least once on a page in process: and processor means operating in conjunction with a cache management procedure, for searching unique identifiers of character records stored in said cache memory to determine if a required character record is present in said cache memory and, if not and if insufficient memory capacity is available in said cache memory for said required character record, removing one or more character records from said cache memory to make room therein for said required character record, removal of a character record determined by reference to (i) a usage metric associated therewith and (ii) whether said means for determining has found that said character record is required to be used at least once for a page in process in said printer and, if said character record is required for a page in process in said printer, said character record not being removed from said cache memory, irrespective of said usage metric associated with said character record.

2. The printer as recited in claim 1 wherein said usage metric for a character record is determined by said processor from a linked character list which lists unique identifiers of character records in a queue, said linked character list spanning a most recently used character record to a least recently used character record, said cache management procedure attempting removal of a least recently used character record, as determined from said linked character list.

3. The printer as recited in claim 2 wherein said required character record is inserted in said cache memory after other character records have been removed to make room therefor, said unique identifier of said required character record further being entered into said linked character list in a most recently used position in said linked character list, other unique identifiers of character records included in said linked character list accordingly reflecting a lesser recent usage metric.

4. A method for controlling allocation of cache memory space in a printer, said cache memory space employed for storage of print data, said method comprising the steps of:

(a) maintaining a list of print data records recently employed by said printer in a print action, said list arranged so as to enable determination of a ranking of usage among listed print data records;

(b) for each print data record stored in said cache memory space, providing an indication if said print data is required to be used at least once for a page being processed by said printer;

(c) responding to a requirement for a next print data record by determining said next print data record is stored in said cache memory space and, if not, and if sufficient cache memory space is available, storing said next print data record in said cache memory space; or (d) responding to a requirement for a next print data record by determining if said next print data record is stored in said cache memory space and if not, and if insufficient cache memory space is available to store said next print data record, removing at least a print data record determined from said list of print data records as manifesting a lowest ranking of usage, from said cache memory space to make room for said next print data record, said print data record manifesting said lowest ranking of usage being removed only if it is not indicated as being required for use at least once for a page currently being processed by said printer; and e) in conjunction with steps (c) or (d), revising said list of print data records to reflect insertion of said next print data record.

5. The method as recited in claim 4 wherein step (d), upon finding that a print data record manifesting a lowest ranking of usage is required for a page being processed by said printer, does not remove said print data record from said cache memory space, but rather moves to a print data record manifesting a next higher ranking of usage in said list of print data records and removes said print data record from said cache memory space only if said print data record is determined not to be required for a page being processed by said printer; said step (d) repeatedly moving to a print data record manifesting a next higher ranking of usage until a print data record is found which is not required for a page being processed by said printer and removing said found print data record from said cache memory space.

6. The method as recited in claim 5 wherein step (a) maintains said list of print data records in a queue ranging from a most recently used print data record to a least recently used print data record.

7. The method as recited in claim 6 wherein step (e) causes said next print data record to be placed in said queue as the most recently used print data record.

8. The method as recited in claim 4 further comprising the step of:

(a1) calculating an amount of said cache memory space required to store a next print data record so as to enable step (c) to employ said calculated cache memory amount to determine if sufficient cache memory space is available.

9. The method as recited in claim 8 wherein step (d) employs the calculated amount of cache memory space required for said next print data record to determine if removal of a print data record which is indicated by said list of print data records as manifesting a lowest ranking of usage will free enough memory and, if not, removing additional print data records manifesting higher levels of usage to free-up at least said calculated amount of cache memory space.

10. The method as recited in claim 4 wherein step (c) determines if a print data record is present in said cache memory space by searching unique identifiers associated with print data records stored in said cache memory space.

* * * * *